United States Patent
Kumar et al.

(10) Patent No.: US 10,529,099 B2
(45) Date of Patent: Jan. 7, 2020

(54) OVERLAY VISUALIZATIONS UTILIZING DATA LAYER

(71) Applicant: SAP SE, Walldorf (DE)

(72) Inventors: Viren Kumar, Vancouver (CA); Amir Hajizadeh, Vancouver (CA)

(73) Assignee: SAP SE, Walldorf (DE)

( * ) Notice: Subject to any disclaimer, the term of this patent is extended or adjusted under 35 U.S.C. 154(b) by 770 days.

(21) Appl. No.: 15/182,374

(22) Filed: Jun. 14, 2016

(65) Prior Publication Data

US 2017/0357693 A1    Dec. 14, 2017

(51) Int. Cl.
| | | |
|---|---|---|
| G06F 16/30 | (2019.01) | |
| G06T 11/20 | (2006.01) | |
| G06F 16/248 | (2019.01) | |
| G06F 16/2455 | (2019.01) | |

(52) U.S. Cl.
CPC .......... *G06T 11/206* (2013.01); *G06F 16/248* (2019.01); *G06F 16/24556* (2019.01); *G06T 2200/24* (2013.01)

(58) Field of Classification Search
CPC .................................................. G06F 16/248
See application file for complete search history.

(56) References Cited

U.S. PATENT DOCUMENTS

| | | | |
|---|---|---|---|
| 5,991,754 A | 11/1999 | Raitto et al. | |
| 7,461,057 B2 | 12/2008 | Radestock et al. | |
| 7,840,607 B2 | 11/2010 | Henigman et al. | |
| 9,633,076 B1 * | 4/2017 | Morton | G06F 16/248 |
| 2002/0070953 A1 | 6/2002 | Barg et al. | |
| 2006/0116975 A1 | 6/2006 | Gould et al. | |
| 2007/0198601 A1 | 8/2007 | Prahlad et al. | |
| 2009/0006318 A1 | 1/2009 | Lehtipalo et al. | |
| 2009/0313268 A1 | 12/2009 | Folting et al. | |

(Continued)

FOREIGN PATENT DOCUMENTS

WO    2012125166    9/2012

OTHER PUBLICATIONS

Article entitled "Tableau Desktop Help", by Tableau, dated 2015.*

(Continued)

*Primary Examiner* — Mahesh H Dwivedi
(74) *Attorney, Agent, or Firm* — Fountainhead Law Group P.C.

(57) ABSTRACT

Overlay visualizations are implemented utilizing data of a data layer. A table comprises a measure and two or more different dimensions mapping to a same value range. For visualization, the measure for those dimensions may be plotted along a common axis in a same chart. Accordingly, a query executes a UNION of multiple subqueries. A first subquery aggregates the first dimension over the value range, injecting a constant formula field to identify the original first dimension. A second subquery aggregates the second dimension over the value range, again injecting the constant formula field to identify the original second dimension. UNION of these subquery results presents one larger dataset for input to the overlying visualization layer. The constant formula field may be relied upon to differentiate between the combined dimensions on the common axis, allowing association of the measure values with the original dimensions in the displayed plot (e.g., via coloring).

20 Claims, 15 Drawing Sheets

(56) References Cited

U.S. PATENT DOCUMENTS

| | | | |
|---|---|---|---|
| 2010/0134501 A1 | 6/2010 | Lowe et al. | |
| 2013/0117217 A1 | 5/2013 | Bhide et al. | |
| 2013/0346429 A1 | 12/2013 | Bratz et al. | |
| 2014/0074801 A1 | 3/2014 | Kacher et al. | |
| 2014/0193116 A1 | 7/2014 | Bylander et al. | |
| 2016/0335318 A1* | 11/2016 | Gerweck | G06F 16/2282 |
| 2017/0039741 A1* | 2/2017 | Bhatnagar | G06Q 40/12 |
| 2017/0147643 A1* | 5/2017 | Zaidi | G06F 16/2428 |
| 2017/0185655 A1 | 6/2017 | Jahankhani et al. | |
| 2017/0193024 A1 | 7/2017 | Fung et al. | |
| 2017/0193116 A1* | 7/2017 | Wong | G06F 3/0484 |
| 2018/0181617 A1 | 6/2018 | Ghaemi et al. | |

OTHER PUBLICATIONS

Article entitled "Data Blending: Why are Some Metric Values Blank in Documents Using Multiple Datasets in MicroStrategy Analytics Enterprise 9.4.1", dated May 16, 2014.*

Alan Eldridge, "Best Practices for Designing Efficient Tableau Workbooks", Tableau Workbooks, Jan. 31, 2013, 2013, pp. 1-33.

Pit Fender, "Section 1.1, Motivation" In: Efficient Memorization Algorithms for Query Optimization, Dec. 11, 2014,Anchor Publishing, Hamburg, pp. 15-17.

Grant Fritchey, "Chapter 9: Execution plan Cache Analysis" In: "SQL Server 2012 Query Performance Tuning,", Jun. 19, 2012, Apress, Berkely, CA, pp. 241-279.

Anonymous, "Artifact (software development)", Wikipedia, Oct. 28, 2015, retrieved from the Internet: URL: https://en.wikipedia.org/w/index.php?title=Artifact_(software_development)&oldid=687975121, pp. 1-2.

Anonymous, "Subset", Wikipedia, Dec. 17, 2015, retrieved from the Internet: URL:https://en.wikipedia.org/w/index.php?title=Subset&oldid=695672410, pp. 1-4.

Tableau Software: Data Blending: Uncovering the Magic and Mystery (In English), YouTube, Nov. 20, 2014, Retrieved from the Internet: URL:https://www.youtube.com/watch?v=6cMri9oXLfw.

European Search Report, dated Mar. 24, 2017, from a corresponding foreign application, EP 16002728.0, 18 pages.

Extended European Search Report, dated May 19, 2017, from a corresponding foreign application, EP 16002750.4, 10 pages.

Kristi Morton et al., "Dynamic Workload Driven Data Integration in Tableau", Proceedings of the 2012 International Conference on Management of Data, SIGMOD '12, May 20-24, 2012, 10 pages.

Internet article entitled "What is Data Blending?", retrieved from http://www.datawatch.com/what-is-data-blending/, retrieved Dec. 28, 2015.

Anonymous, "Definitive Guide to Data Blending" Aug. 1, 2014, 6 pages.

European Search Report, dated Dec. 1, 2018, from a corresponding foreign application, EP 18196747.2, 10 pages.

* cited by examiner

FIG. 7A

```
{
  "dataQuery": {
    "dataSources": [
      {
        "entities": [
          {
            "analyticType": "dimension",
            "attributes": {
              "value": {
                "id": "id_7"
              }
            },
            "id": "id_6",
            "key": {
              "id": "id_7"
            },
            "refId": "EM_4"
          },
          {
            "aggregationType": "formula",
            "analyticType": "measure",
            "id": "CALCULATION_0",
            "key": {
              "formula": {
                "AST": {
                  "kind": "exec",
                  "root": {
                    "kind": "cst",
                    "type": "string",
                    "value": "Start Date"
```

FIG. 7B

```
          }
        },
        "text": "\"Start Date\""
      },
      "id": "CALCULATION_0"
    },
    "refId": "EM_5"
  },
  {
    "aggregationType": "sum",
    "analyticType": "measure",
    "id": "id_10",
    "key": {
      "id": "id_10"
    },
    "refId": "EM_3"
  }
],
"filters": [
  {
    "answers": [
      {
        "arguments": [
          "2015-03-01",
          "2015-02-01"
        ],
        "function": "IN"
      }
    ],
    "attributeId": "id_7",
```

FIG. 7C

```
            "entityId": "id_6",
            "exclude": false,
            "type": "filter"
          }
        ],
        "id": "2",
        "info": {
          "id": "2/0f810ab9-948f-4e33-a117-36548931c095"
        },
        "inputParameters": [],
        "refId": "2"
      },
      {
        "entities": [
          {
            "analyticType": "dimension",
            "attributes": {
              "value": {
                "id": "id_9"
              }
            },
            "id": "id_8",
            "key": {
              "id": "id_9"
            },
            "refId": "EM_4"
          },
          {
            "aggregationType": "formula",
            "analyticType": "measure",
```

FIG. 7D

```
        "id": "CALCULATION_1",
        "key": {
          "formula": {
            "AST": {
              "kind": "exec",
              "root": {
                "kind": "cst",
                "type": "string",
                "value": "End Date"
              }
            },
            "text": "\"End Date\""
          },
          "id": "CALCULATION_1"
        },
        "refId": "EM_5"
      },
      {
        "aggregationType": "sum",
        "analyticType": "measure",
        "id": "id_10",
        "key": {
          "id": "id_10"
        },
        "refId": "EM_3"
      }
    ],
    "filters": [
      {
        "answers": [
```

FIG. 7E

```
          {
            "arguments": [
              "2015-03-01",
              "2015-02-01"
            ],
            "function": "IN"
          }
        ],
        "attributeId": "id_7",
        "entityId": "id_6",
        "exclude": false,
        "type": "filter"
      }
    ],
    "info": {
      "id": "2/0f810ab9-948f-4e33-a117-36548931c095"
    },
    "inputParameters": [],
    "refId": "1002"
  }
],
"synchronization": {
  "primary": {
    "id": "2"
  },
  "secondaries": [
    {
      "excludeSecondaryColumnsFromResult": true,
      "id": "1002",
      "joinCondition": {
```

FIG. 7F

```
          "primaryAttributes": [
            "id_6",
            "CALCULATION_0",
            "id_10"
          ],
          "secondaryAttributes": [
            "id_8",
            "CALCULATION_1",
            "id_10"
          ]
        },
        "synchronizationType": "FULL_OUTER"
      }
    ]
  }
},
"layout": {
  "axis1": {
    "axisType": "categorical",
    "components": [
      {
        "id": "EM_4"
      }
    ],
    "page": 0,
    "pageSize": 100000
  },
  "axis2": {
    "axisType": "categorical",
    "components": [
```

FIG. 7G

```
      {
        "id": "EM_5"
      }
    ],
    "page": 0,
    "pageSize": 100000
  },
  "measureGroup1": {
    "axisType": "numerical",
    "components": [
      {
        "id": "EM_3"
      }
    ]
  }
},
"properties": {
  "computeDistinctCount": false,
  "computeRanges": false,
  "facetCount": false,
  "isVisualSort": true,
  "maxDataPoints": 100000
 }
}
```

OVERLAY VISUALIZATIONS UTILIZING DATA LAYER

BACKGROUND

Unless otherwise indicated herein, the approaches described in this section are not prior art to the claims in this application and are not admitted to be prior art by inclusion in this section.

Embodiments relate to storage and management of data, and in particular to methods and apparatuses implementing overlay visualizations utilizing a data layer. Specific embodiments allow different information types to be displayed along a same axis of a chart.

Databases and overlying applications referencing data stored therein, offer a powerful way of storing and analyzing large volumes of data that are related in various ways. In particular, discrete values of stored data may be organized into larger data structures comprising related fields.

Such larger data structures may also be referred to as data objects, and can be represented in the form of tables having rows and columns. Through the skillful and intuitive presentation of such data structures in the form of tables and charts, a user can describe complex issues and the factual/forecast data underlying those issues.

In analytics applications, data fields are generally divided into two categories: measures and dimensions. Measures are typically continuous numerical values, while dimensions are mostly categorical and discrete.

To create charts, a user can assign one or more fields to each of the axes. For example in a column chart a user can assign a dimension to the horizontal axis, and assign a measure to the vertical axis representing values of the measure for each distinct value of the dimension.

On occasion, it may be desired to plot one measure based upon two dimensions from the same value set. One example could be to plot a number of tasks for a first dimension representing task start date, and a second dimension representing task end date.

The underlying data that is to be visualized, may be present within a data layer in Structured Query Language (SQL) tabular format. However such a data layer allowing data visualizations by mapping dimensions and measures to chart axes, may not permit a same shared axis to be used for more than one set of values.

In an attempt to overcome this problem, conventional approaches may rely upon a visualization layer to separately generate charts, and then modify those charts to superimpose them. Such an approach may add complexity and expense by consuming significant processing resources in the visualization layer. This problem may be exacerbated where data in the data layer is being updated, and the visualization layer is forced to generate new visualizations and freshly superimpose them each time.

SUMMARY

Embodiments implement overlay visualizations utilizing data of a data layer. A database table comprises a measure and two or more different dimensions mapping to a same value range. To promote visualization, the measure for those dimensions may be plotted along a common axis in a same chart. Accordingly, a query executes an operation (e.g., UNION, FULL OUTER JOIN) combining multiple subqueries. A first subquery aggregates the first dimension over the value range, injecting a constant formula field to identify the original first dimension. A second subquery aggregates the second dimension over the value range, again injecting the constant formula field to identify the original second dimension. The combination (e.g., UNION, FULL OUTER JOIN) of these subquery results presents one larger unified dataset for input to the overlying visualization layer. The constant formula field may be referenced to differentiate between the combined dimensions on the common axis, thereby allowing the measure values to be associated with the original dimensions in the displayed plot (e.g., via coloring, point shape, etc.)

An embodiment of a computer-implemented method comprises, referencing a dataset comprising a measure, a first dimension, and a second dimension, in order to display an option to combine the first dimension and the second dimension. In response to an input selecting the option, a query is formulated comprising an operation combining a first subquery aggregating the first dimension into a combined dimension and including a field indicating the first dimension, and a second subquery aggregating the second dimension into the combined dimension and including the field indicating the second dimension. The query is communicated to a data layer. A query result is received comprising the measure, the combined dimension, and the field. The query result is referenced to display a chart comprising the measure and the combined dimension on a common axis with an affordance of the first dimension and the second dimension based upon the field.

A non-transitory computer readable storage medium embodies a computer program for performing a method comprising referencing a dataset comprising a measure, a first dimension, and a second dimension, in order to display an option to combine the first dimension and the second dimension. In response to an input selecting the option, formulating a query comprising an operation combining a first subquery aggregating the first dimension into a combined dimension and including a field indicating the first dimension, and a second subquery aggregating the second dimension into the combined dimension and including the field indicating the second dimension. The query is formatted as a JavaScript Object Notation (JSON) query object. The JSON query object is communicated to a data layer. A JSON result object is received comprising the measure, the combined dimension, and the field. The JSON result object is parsed to display a chart comprising the measure and the combined dimension on a common axis with an affordance of the first dimension and the second dimension based upon the field.

An embodiment of a computer system comprises one or more processors and a software program, executable on said computer system. The software program is configured to cause an in-memory database engine to reference a dataset in an in-memory database and comprising a measure, a first dimension, and a second dimension, in order to display an option to combine the first dimension and the second dimension. In response to an input selecting the option, the software program is further configured to cause the in-memory database engine to formulate a query comprising an operation combining a first subquery aggregating the first dimension into a combined dimension and including a field indicating the first dimension, and a second subquery aggregating the second dimension into the combined dimension and including the field indicating the second dimension. The query is communicated to the in-memory database. A query result is received comprising the measure, the combined dimension, and the field. The query result is referenced to display a chart comprising the measure and the combined dimension on a common axis with an affordance of the first dimension and the second dimension based upon the field.

In certain embodiments the operation comprises a UNION operation.

According to some embodiments the operation comprises a FULL OUTER JOIN operation.

In particular embodiments the dataset further comprises a third dimension. The operation further combines a third subquery aggregating the third dimension into the combined dimension and including the field indicating the third dimension, and the chart is generated with the affordance of the third dimension based upon the field.

In various embodiments the first subquery aggregates the first dimension as a sum.

In particular embodiments the first subquery aggregates the first dimension as an average.

According to certain embodiments the affordance comprises a color, a point symbol, or a line type.

Some embodiments further comprise formatting the query as a JavaScript Object Notation (JSON) query object.

According to various embodiments the query result is received as a JSON result object, and the method further comprises parsing the JSON result object to display the chart.

The following detailed description and accompanying drawings provide a better understanding of the nature and advantages of embodiments.

BRIEF DESCRIPTION OF THE DRAWINGS

FIGS. 7A-7G show an example of a JavaScript Object Notation (JSON) query object.

DETAILED DESCRIPTION

Described herein are methods and apparatuses that implement overlay visualizations in a data layer. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Embodiments implement overlay visualizations utilizing data of a data layer. A database table comprises a measure and two or more different dimensions mapping to a same value range. To promote visualization, the measure for those dimensions may be plotted along a common axis in a same chart. Accordingly, a query executes an operation (e.g., UNION, FULL OUTER JOIN) combining multiple subqueries. A first subquery aggregates the first dimension over the value range, injecting a constant formula field to identify the original first dimension. A second subquery aggregates the second dimension over the value range, again injecting the constant formula field to identify the original second dimension. The combination of these subquery results presents one larger unified dataset for input to the overlying visualization layer. The constant formula field may be relied upon to differentiate between the combined dimensions on the common axis, thereby allowing the measure values to be associated with the original dimensions in the displayed plot (e.g., via an affordance such as coloring, a plot point shape, etc.).

Embodiments thus offer a mechanism for overlaying data from different dimensions along a common axis in a single chart, based upon data received from a data layer. Embodiments are scalable and can accommodate multiple measures and dimensions.

For example, where N columns of data in the data layer are to be combined on a common axis, N subqueries are executed. Each subquery has a measure accumulated along 1/N columns, together with a constant field utilized to trace the measure value back to the 1/Nth column. The UNION or FULL OUTER JOIN of the two query results produces one larger, unified dataset.

Figure 1:
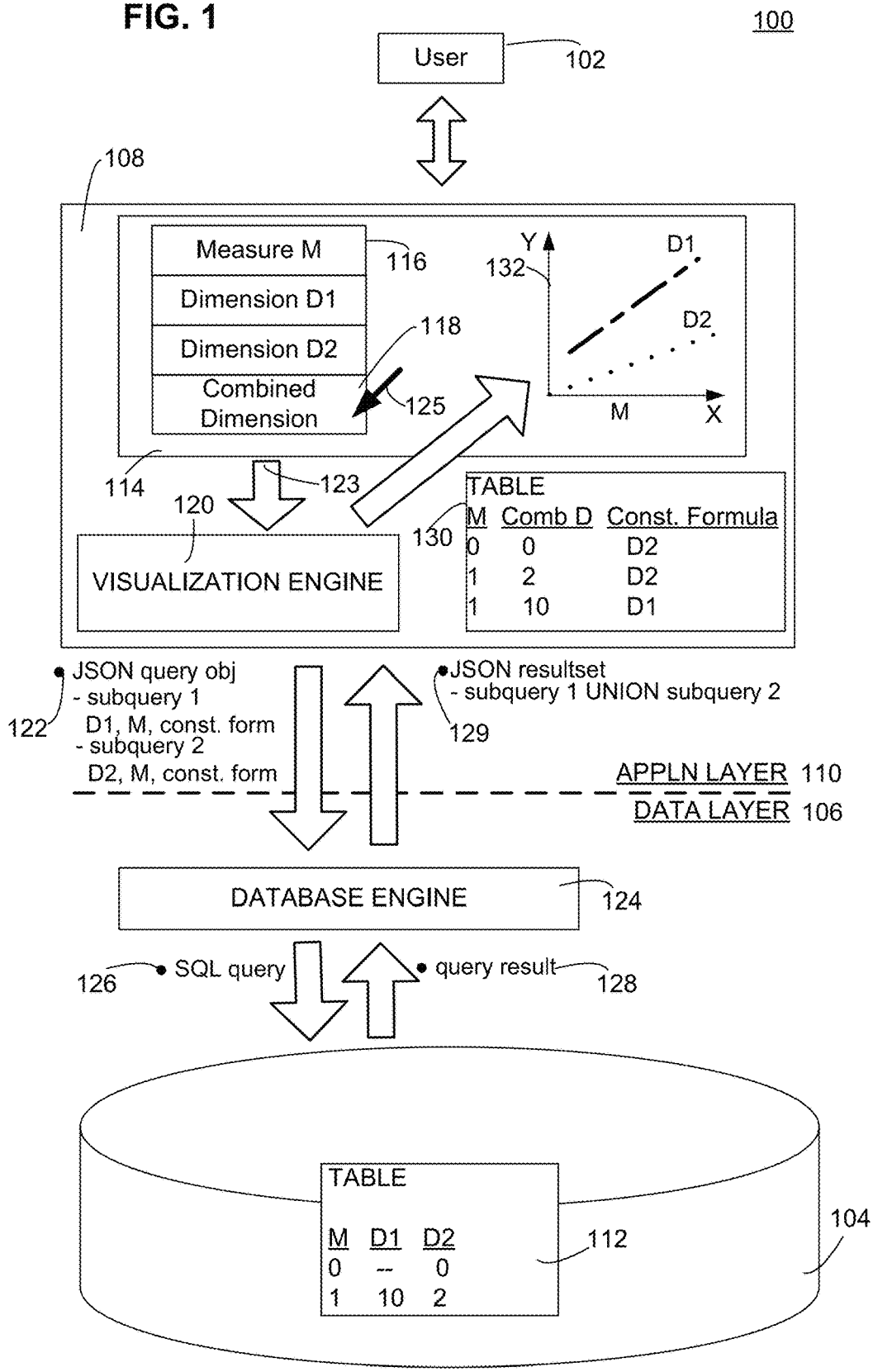
FIG. 1 shows a simplified diagram of a system according to an embodiment.

FIG. 1 shows a simplified view of a system 100 that is configured to implement overlay visualization according to an embodiment. Specifically, a user 102 is in communication with data stored in a database 104 of an underlying data layer 106, via visualization application 108 present in an intervening application layer 110.

In particular, database table 112 comprises a 'table_name' dataset including a measure M and two dimensions D1 and D2. Measure M evidences different trends for each of the dimension D1 and the dimension D2. Those trends are sought to be displayed together in a same chart for viewing and analysis.

Accordingly, the visualization application provides an interface 114 which includes controls 116. Those controls allow user selection of M, D1, D2, and also for a combined dimension 118.

The controls of the user interface are in communication with a visualization engine 120. Upon receiving a selection of measure(s) and dimension(s) by a user, the visualization engine is configured to generate a query 122 for posing to the data in the underlying database.

In particular, in response where the visualization engine receives an input 123 from the interface (e.g., based upon a cursor 125) specifying the combined dimension option, the visualization engine generates a query including the following two subqueries (Q1, Q2) that can yield values for the two data trends evidenced by the dimensions D1 and D2:
Q1->SELECT AGG(M), D1, "D1" FROM 'table_name' GROUP BY D1
Q2->SELECT AGG(M), D2, "D2" FROM 'table_name' GROUP BY D2

Here, AGG is the aggregation method for measure. This aggregation method can comprise sum, average, etc.

The data trends for D1 and D2 reflected in these queries, can be combined using the following query:
Q->Q1 UNION Q2

The visualization engine injects into the query a constant formula field which may have a value of "D1" or "D2". Having "D1" and "D2" as two SQL formulas returning a constant value, permits differentiating between rows of each sub query.

This extra column can later be used to distinguish the two trends for D1 and D2, e.g. via an affordance. Examples of such affordances can include but are not limited to color, plot point shape, line character (e.g., solid, dashed, dotted), etc. For example, the visualization engine can reference the constant formula field to recognize D1 in the query result and provide a dashed line for the dimension D1 data, and recognize D2 in the query result and provide a dotted line for the dimension D2 data.

To facilitate transfer of the query to the data layer, the visualization application formulates the query Q as a JavaScript Object Notation (JSON) object 122, and promulgates that JSON query object to the engine 124 of the underlying database layer.

The database engine receives this JSON query object and parses it. The database engine coverts the query object into a query 126 expressed in a language (e.g., Structured Query Language—SQL) that is understood by the database.

The database then interrogates the table and returns a responsive query result 128 to the database engine. This resultset comprises a dataset with a common column for a single combined dimension, and one column for the measure. Each row of this combined dataset results from either the Q1 or the Q2.

The database engine then converts the SQL query result into a JSON query result object 129, for transport back to the application layer.

The visualization engine receives the JSON result set, and stores it within memory 130 in the database layer. The visualization engine then parses the resultset to split the measure value according to the value of the constant formula field.

Based upon this parsed query result, the visualization engine generates a plot 132 of the D1 and D2 data along a same axis. That combined plot is displayed by the visualization application interface for review by the user.

While the above describes an approach for overlaying data from two dimensions, this is not required. Embodiments may be scaled to have several dimensions and several measures.

For example, assume that dimensions D_1 to D_N are sought to be overlaid for each of measures M_1 to M_J. Accordingly, the original simple SQL query presented above, may be extended as follows:
Q->(SELECT D_1, M_1, M_2, . . . , M_J FROM 'table_name' GROUP BY D_1) UNION
(SELECT D_2, M_1, M_2, . . . , M_J FROM 'table_name' GROUP BY D_1) UNION
(SELECT D_3, M_1, M_2, . . . , M_J FROM 'table_name' GROUP BY D_1) UNION . . .
(SELECT D_N, M_1, M_2, . . . , M_J FROM 'table_name' GROUP BY D_N)

Moreover, embodiments may add the constant formula to each of the sub-queries. The resulting constant value may serve to distinguish between data of different original dimensions that are the result of different sub-queries.

Figure 2:
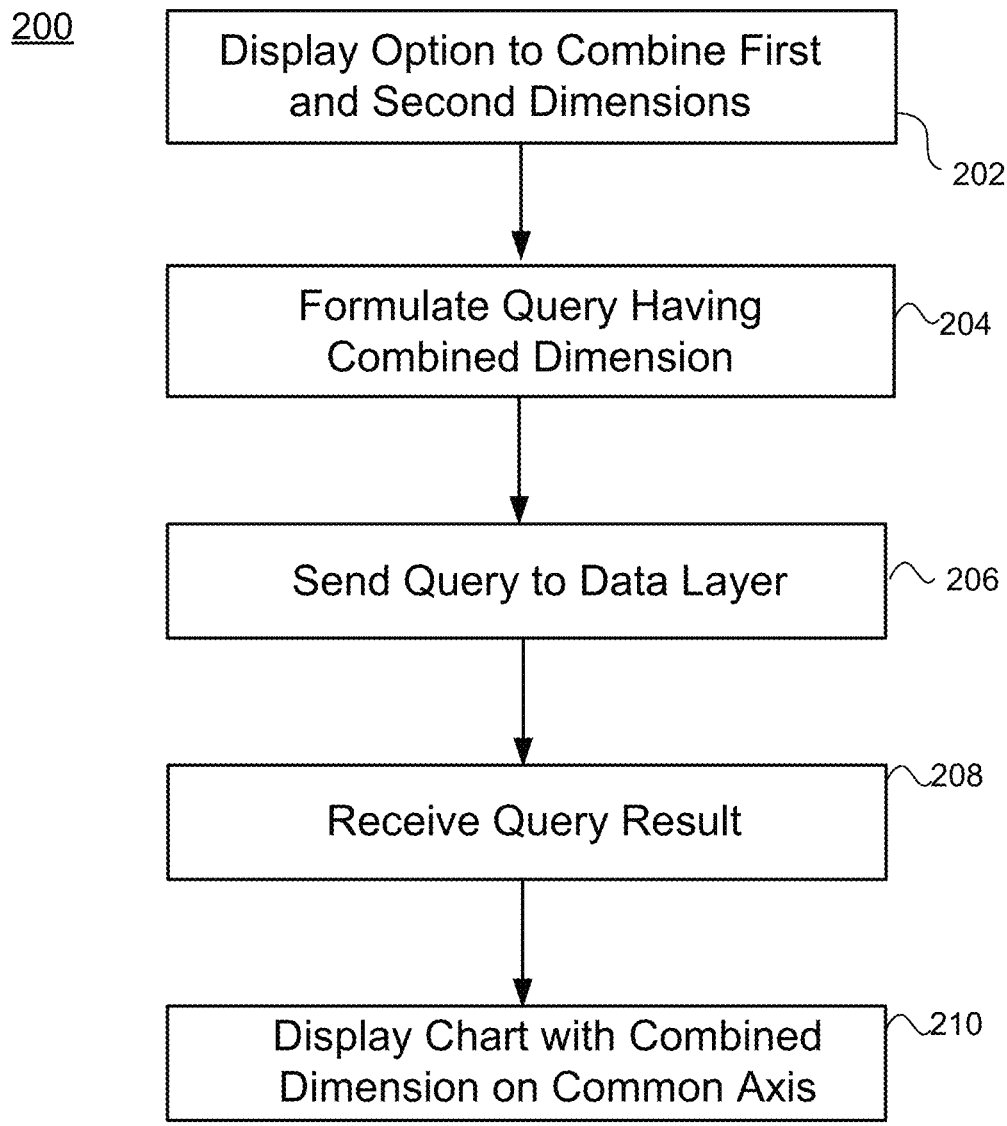
FIG. 2 shows a simplified flow diagram of a method according to an embodiment.

It is further noted that embodiments may achieve a same result using a FULL OUTER JOIN operation rather than a UNION operation. An example of a query under such circumstances may be as follows:
Q->(SELECT D_1, M FROM 'table_name' GROUP BY D_1) a FULL OUTER JOIN
(SELECT D_2, M FROM 'table_name' GROUP BY D_2) b ON a.D_1=b.D_2 AND a.M=b.M FIG. 2 is a simplified flow diagram showing a method 200 according to an embodiment. At 202, a dataset comprising a measure, a first dimension, and a second dimension is referenced to display an option to combine the first dimension and the second dimension.

At 204, in response to an input selecting the option, a query is formulated that comprises an operation combining a first subquery aggregating the first dimension into a combined dimension and including a field indicating the first dimension, and a second subquery aggregating the second dimension into the combined dimension and including the field indicating the second dimension.

At 206 the query is communicated to a data layer. At 208 a query result is received comprising the measure, the aggregated dimension, and the field.

At 210, the query result is referenced to display a chart comprising the measure and the aggregated dimension on a common axis with an affordance of the first dimension and the second dimension based upon the field.

EXAMPLE

An example is now presented in connection with visualization of task start dates and task end dates. The following table presents this data for five (5) different tasks.

| Task ID | Start Date | End Date |
|---------|------------|----------|
| A | Jan. 1 | Feb. 15 |
| B | Feb. 1 | Mar. 15 |
| C | Mar. 1 | Apr. 30 |
| D | Apr. 1 | May 15 |
| E | May 1 | Jun. 30 |

A user may seek to know how many tasks are outstanding on a given date. In order to determine this information, ordinarily a user would be forced to count the number of tasks started by that date, and subtract the number of tasks that had been completed by that date.

A first step toward this goal would be to add a running sum for the number of started and completed tasks. This would result in the following table.

| Task ID | Start Date | End Date | Count (Started Tasks) | Count (Ended Tasks) |
|---------|------------|----------|-----------------------|---------------------|
| A | Jan. 1 | Feb. 15 | 1 | 1 |
| B | Feb. 1 | Mar. 15 | 2 | 2 |
| C | Mar. 1 | Apr. 30 | 3 | 3 |
| D | Apr. 1 | May 15 | 4 | 4 |
| E | May 1 | Jun. 30 | 5 | 5 |

This table, however, offers little intuitive insight to a user. For example, the respective counts for started and ended tasks do not line up in a given row.

The information in the above table becomes easier to understand, if it is split up into the following two tables.

| Task ID | Start Date | Count (Started Tasks) |
|---------|------------|-----------------------|
| A | Jan. 1 | 1 |
| B | Feb. 1 | 2 |
| C | Mar. 1 | 3 |
| D | Apr. 1 | 4 |
| E | May 1 | 5 |

| Task ID | End Date | Count (Ended Tasks) |
|---------|----------|---------------------|
| A | Feb. 15 | 1 |
| B | Mar. 15 | 2 |
| C | Apr. 30 | 3 |
| D | May 15 | 4 |
| E | Jun. 30 | 5 |

It is straightforward to visualize these tables as separate charts. Specifically, FIG. 3 is a chart displaying the tasks by start date, and FIG. 4 is a chart displaying the tasks by end date.

The user's end goal, however, is to determine how many outstanding tasks exist on any given date. The two charts of FIGS. 3-4 are of little practical value in readily affording this information to a user.

Figure 3:
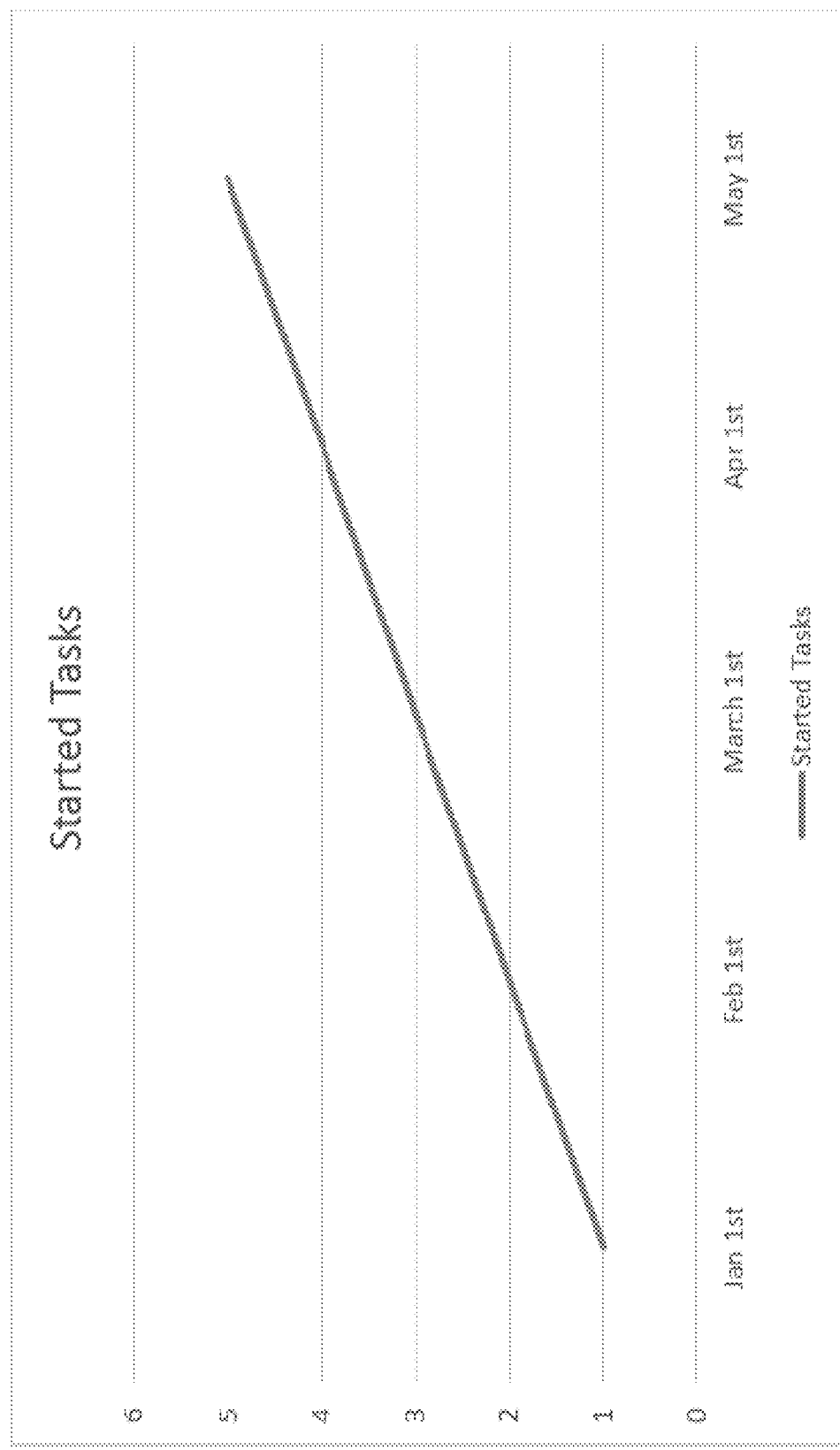
FIG. 3 is a chart displaying tasks by start date.
Figure 4:
FIG. 4 is a chart displaying tasks by end date.

One possible solution would be to overlay together the existing two chart visualizations of FIGS. 3-4. However the X-axis of FIG. 3 (January 1-May 1) is different from the X-axis of FIG. 4 (February 15-June 30).

A hybrid chart could theoretically be constructed on a visualization level with an X-axis date range encompassing FIGS. 3 and 4. But, the underlying data for such a hybrid chart would not be present in the base data. For example, while the chart of FIG. 3 contains data for the first of the month, the chart of FIG. 4 contains data for the $15^{th}$ and $30^{th}$ of the month.

It is further noted that that a conventional approach based upon overlaying already-existing visualizations, requires for the steps of:
1) breaking the tables apart manually
2) separately creating the visualizations and
3) overlaying the separate visualizations.

This process can be time-consuming and labor-intensive. Moreover, if splitting the original data table is not an option, the conventional approach based upon the already-existing visualizations themselves, is not feasible.

Accordingly, embodiments address this data visualization issue within the query layer and the data layer, rather than in the overlying visualization layer. Specifically, the original table within the data layer, is again reproduced below.

| Task ID | Start Date | End Date |
|---------|------------|----------|
| A | Jan. 1 | Feb. 15 |
| B | Feb. 1 | Mar. 15 |
| C | Mar. 1 | Apr. 30 |
| D | Apr. 1 | May 15 |
| E | May 1 | Jun. 30 |

Here, it is sought to combine two columns (Start Date, End Date) on a common axis. In an embodiment, two subqueries may be executed, where each subquery has a measure (Count) accumulated along ½ columns, along with a constant field which may be used to trace the measure value back to the ½ column.

Armed with these two subqueries, a UNION operation may be executed on them. This combines the two subquery results to produce one larger, unified dataset. An example of such a query using industry-standard Structured Query Language (SQL) is as follows:

SELECT START_DATE AS "COMBINED_DATE", RUNNING_SUM(COUNT(TASK)), CONSTANT("START_DATE") FROM FACT_TABLE
GROUP BY START_DATE
UNION
SELECT END_DATE AS "COMBINED_DATE", RUNNING_SUM(COUNT(TASK)), CONSTANT("END_DATE") FROM FACT_TABLE
GROUP BY END_DATE

For purposes of illustration, the results of the sub-queries are shown below.

| Start Date | Count(Started Tasks) | Constant Formula |
|------------|----------------------|------------------|
| Jan. 1 | 1 | "Start Date" |
| Feb. 1 | 2 | "Start Date" |
| Mar. 1 | 3 | "Start Date" |
| Apr. 1 | 4 | "Start Date" |
| May 1 | 5 | "Start Date" |

| End Date | Count(Ended Tasks) | Constant Formula |
|----------|--------------------|------------------|
| Feb. 15 | 1 | "End Date" |
| Mar. 15 | 2 | "End Date" |
| Apr. 30 | 3 | "End Date" |
| May 15 | 4 | "End Date" |
| Jun. 30 | 5 | "End Date" |

Execution of the UNION operation on these subquery results, combines them to produce the single, larger unified dataset below.

| Combined Date | Count(Tasks) | Constant Formula |
|---------------|--------------|------------------|
| Jan. 1 | 1 | "Start Date" |
| Feb. 1 | 2 | "Start Date" |
| Mar. 1 | 3 | "Start Date" |
| Apr. 1 | 4 | "Start Date" |
| May 1 | 5 | "Start Date" |
| Feb. 15 | 1 | "End Date" |
| Mar. 15 | 2 | "End Date" |
| Apr. 30 | 3 | "End Date" |
| May 15 | 4 | "End Date" |
| Jun. 30 | 5 | "End Date" |

Sorting this table by date, produces the following.

| Combined Date | Count(Tasks) | Constant Formula |
|---------------|--------------|------------------|
| Jan. 1 | 1 | "Start Date" |
| Feb. 1 | 2 | "Start Date" |
| Feb. 15 | 1 | "End Date" |
| Mar. 1 | 3 | "Start Date" |
| Mar. 15 | 2 | "End Date" |
| Apr. 1 | 4 | "Start Date" |
| Apr. 30 | 3 | "End Date" |
| May 1 | 5 | "Start Date" |
| May 15 | 4 | "End Date" |
| Jun. 30 | 5 | "End Date" |

Figure 5:
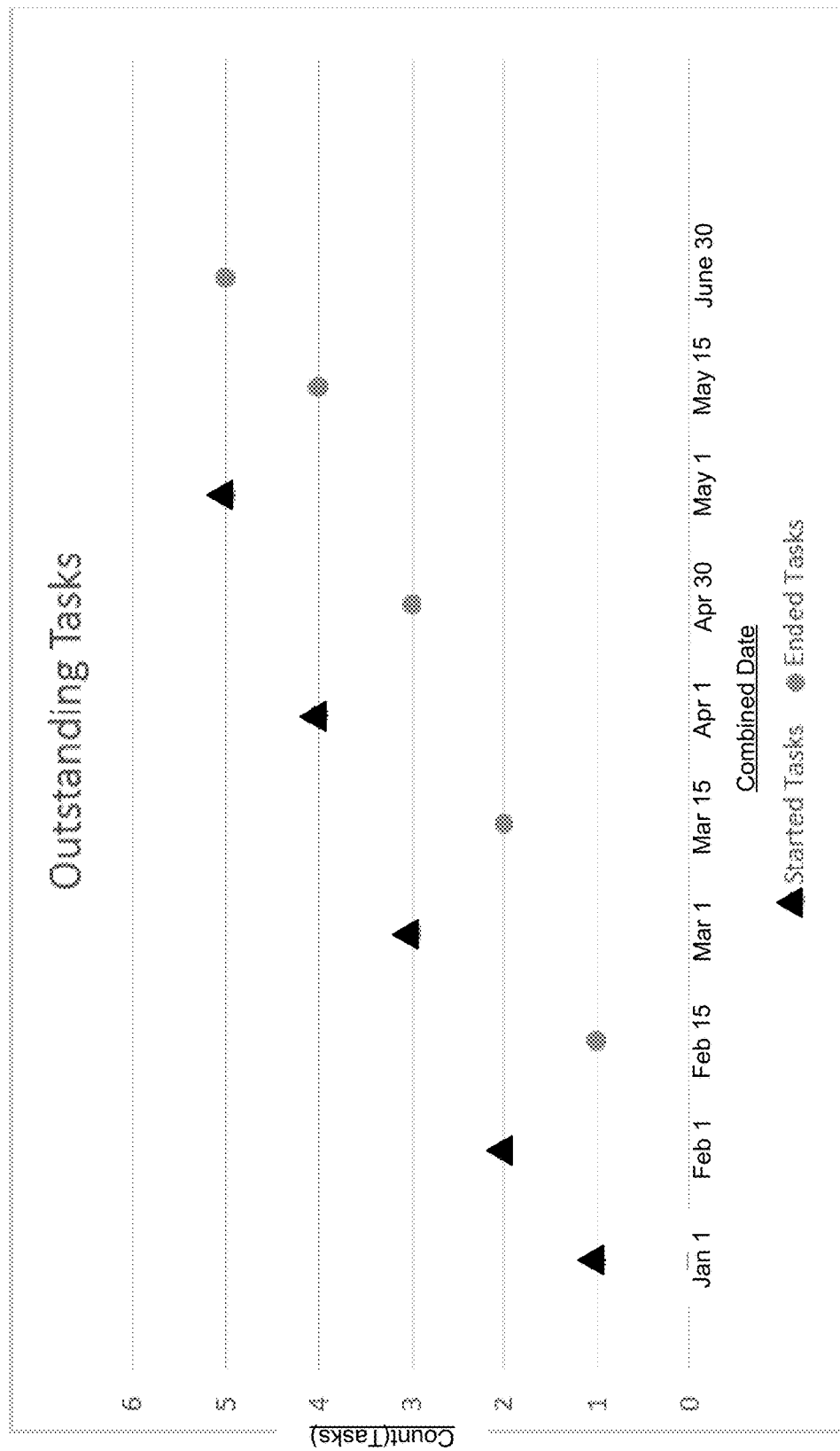
FIG. 5 is a chart plotting tasks by start date and end date along a common axis.

Aligning the data points from the above sorted table on the combined date axis, produces the chart shown in FIG. 5.

User understanding of this resultset could be based upon prior knowledge of which columns were combined into the same axis. This would allow the identification of the measures from the results, based on the constant formula field in the resultset.

Here, the shape of the points (e.g., triangular, circular) plotted in FIG. 5 are based on the value of the extra constant formula column in the sorted table. The chart thus affords the user with sufficient visual information to readily determine outstanding tasks from the overlaid start date and end date data.

Figure 6:
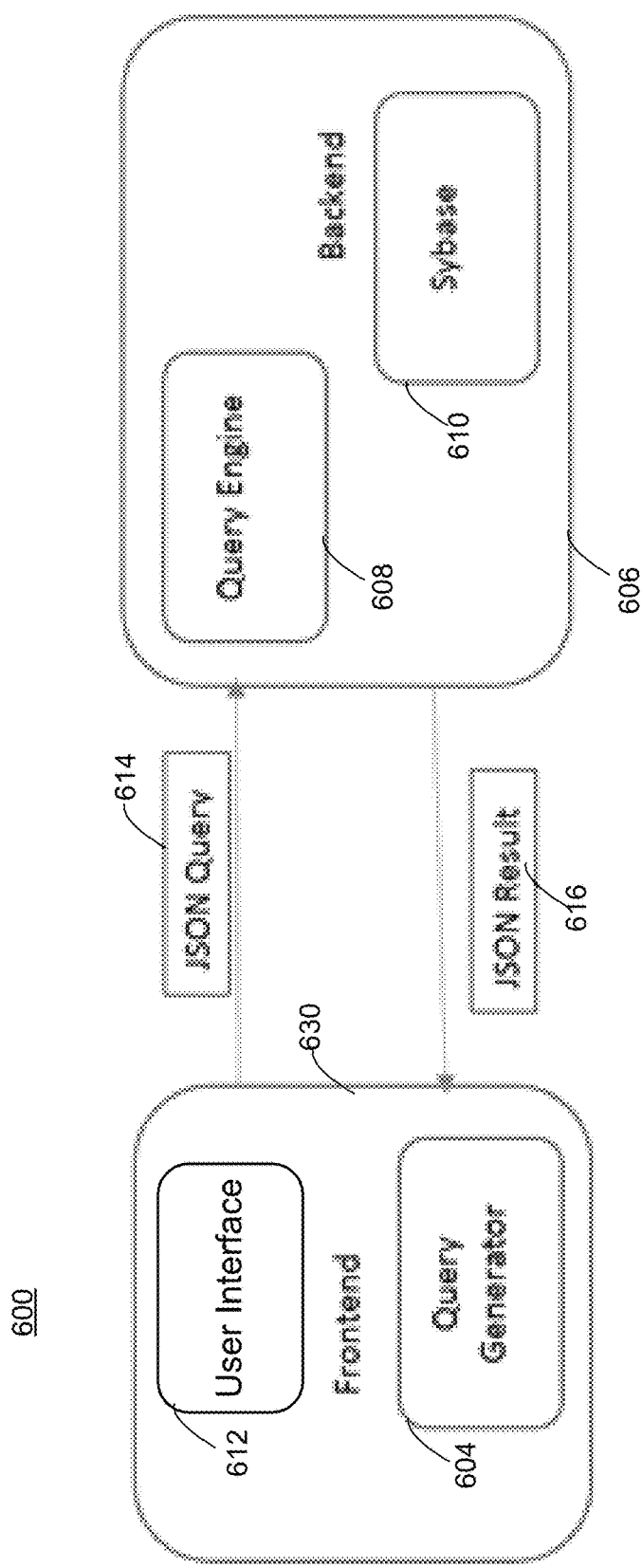
FIG. 6 is a simplified block diagram showing one example of a system.

A more specific example is now provided in the context of the Lumira Desktop data visualization business intelligence tool available from SAP SE of Walldorf, Germany. FIG. 6 shows a simplified view of the Lumira desktop system 600.

The Lumira desktop system 600 is a client-server business intelligence (BI) tool. Here, the client is a Javascript-based Frontend 602 including a query generator 604.

The backend 606 comprises a Java application server that includes a query engine 608, which is configured to construct a query 614 a database 610 (in this example a Sybase database). Details of a query example are shown in FIGS. 7A-7G discussed below.

Here, the user accesses the user interface (UI) 612 on the Frontend in order to construct a visualization. In this example the user can specify time dimensions to combine into a common axis on a line chart.

The Time Dimension shelf of the user interface is occupied by a "Combined" token, which includes both the Start Date (create date) and End Date (close date) dimensions. These subqueries are combined through an operation as has been described above.

Based on the dimensions and measures that are selected in the UI, a query is constructed using the Query Generator in the client. This query 614 is specified in Javascript Object Notation (JSON) format.

One benefit of using a JSON-based query language, is that the query is agnostic of the specific database implementation. Thus while FIG. 6 happens to show a Sybase database, the JSON Query also works with other databases, for example the HANA in-memory database also available from SAP SE.

FIGS. 7A-7G show an example of the JSON query. This JSON query object is in a particular BI query format specifying the following.

Datasources. Datasources are the entities that make up the data components of the chart (i.e., the points that are visualized).

Entity. An entity is a measure or dimension in a dataset.

Synchronization. Synchronization is a description of how two datasets should be joined (e.g., an inner join, a full outer join, etc.)

Layout. Layout is the physical layout of the query behind the chart—the axes that take the dimensions and measures. A categorical axis takes dimensions, while a value axis is numerical and accepts only measures. Layout is used to specify the measures and dimensions to aggregate on.

Here it is noted that the specific JSON query object example of FIGS. 7A-7G, utilizes a FULL OUTER JOIN operation (rather than a UNION operation) in order to combine the subqueries.

Returning to FIG. 6, the JSON query is sent to the Backend server. There, the JSON query is parsed and converted into the database's query language (e.g., SQL) by the Query Engine.

The query is then executed on the database to produce a database-dependent resultset. The query engine on the Backend converts the database-dependent implementation of the resultset into a JSON result object 616. That JSON result object is in a format readily allowing it be transported back to the client for subsequent reparsing.

Specifically, when the JSON result object is returned to the client, the constant formula field may be referenced to differentiate between the combined dimensions on the common axis (here, representing time). This allows the measures to be split back into the dimensions that were earlier combined on the common axis. Those dimensions can then be displayed as differentiated data trends actually plotted on the chart.

The examples just provided are given for purposes of illustration only, and embodiments are not limited to them. Thus while FIG. 1 shows the visualization engine as part of the application layer, this is not required.

In certain embodiments the visualization engine may be implemented by a database engine, for example as present in an in-memory database. One example of such an in-memory database engine is that of the HANA in-memory database available from SAP SE of Walldorf, Germany.

Figure 8:
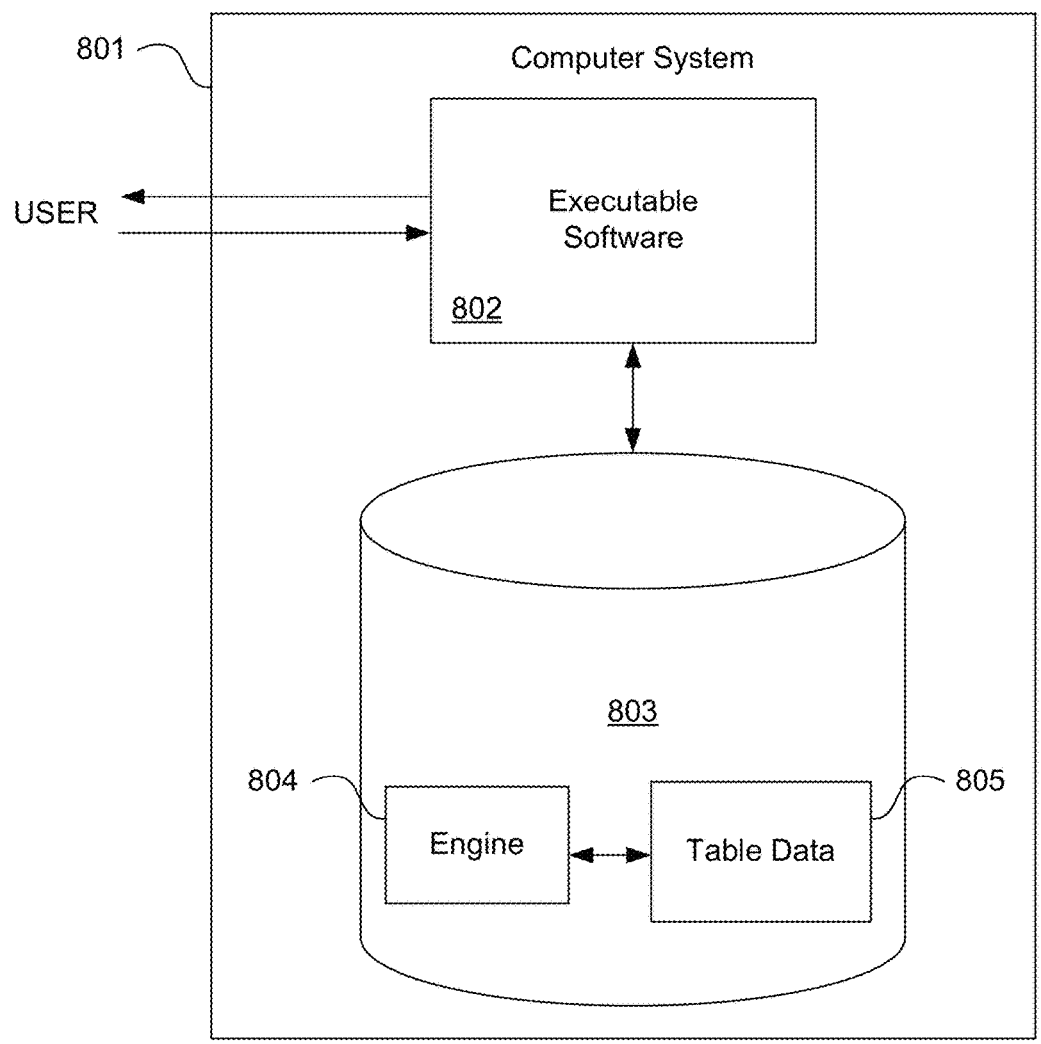
FIG. 8 illustrates hardware of a special purpose computing machine configured to implement overlay visualization according to an embodiment.

For example, FIG. 8 illustrates hardware of a special purpose computing machine configured to implement overlay visualization in a data layer according to an embodiment. In particular, computer system 801 comprises a processor 802 that is in electronic communication with a non-transitory computer-readable storage medium 803. This computer-readable storage medium has stored thereon code 805 corresponding to data in a database table. Code 804 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 8, the engine is shown as being part of a database. Such an embodiment can correspond to applications performing processing by a powerful engine available as part of an in-memory database (e.g., the HANA in-memory database available from SAP SE of Walldorf, Germany). However, this not required and in certain embodiments (e.g., that shown in FIG. 1) the engine may be implemented in other ways, for example as part of an overlying application layer.

Figure 9:
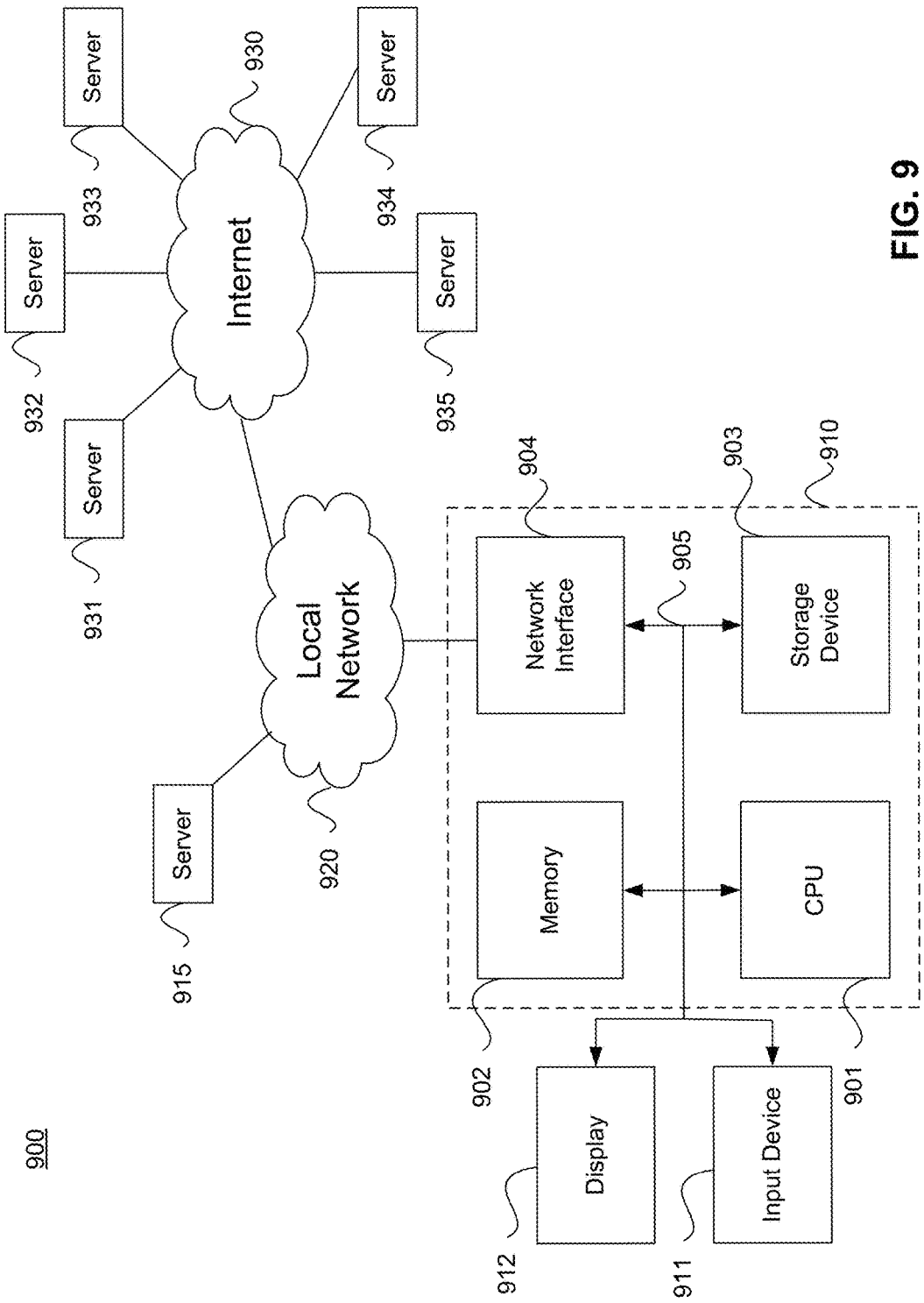
FIG. 9 illustrates an example computer system.

An example computer system 900 is illustrated in FIG. 9. Computer system 910 includes a bus 905 or other communication mechanism for communicating information, and a processor 901 coupled with bus 905 for processing information. Computer system 910 also includes a memory 902 coupled to bus 905 for storing information and instructions to be executed by processor 901, including information and instructions for performing the techniques described above, for example. This memory may also be used for storing variables or other intermediate information during execution of instructions to be executed by processor 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 903 may include source code, binary code, or software files for performing the techniques above, for example. Storage device and memory are both examples of computer readable mediums.

Computer system 910 may be coupled via bus 905 to a display 912, such as a cathode ray tube (CRT) or liquid crystal display (LCD), for displaying information to a computer user. An input device 911 such as a keyboard and/or mouse is coupled to bus 905 for communicating information and command selections from the user to processor 901. The combination of these components allows the user to communicate with the system. In some systems, bus 905 may be divided into multiple specialized buses.

Computer system 910 also includes a network interface 904 coupled with bus 905. Network interface 904 may provide two-way data communication between computer system 910 and the local network 920. The network interface 904 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 904 sends and receives electrical, electromagnetic, or optical signals that carry digital data streams representing various types of information.

Computer system 910 can send and receive information, including messages or other interface actions, through the network interface 904 across a local network 920, an Intranet, or the Internet 930. For a local network, computer system 910 may communicate with a plurality of other computer machines, such as server 915. Accordingly, computer system 910 and server computer systems represented by server 915 may form a cloud computing network, which may be programmed with processes described herein. In the Internet example, software components or services may reside on multiple different computer systems 910 or servers 931-935 across the network. The processes described above may be implemented on one or more servers, for example. A server 931 may transmit actions or messages from one component, through Internet 930, local network 920, and network interface 904 to a component on computer system 910. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   referencing a dataset comprising a measure, a first dimension, and a second dimension, in order to display an option to combine the first dimension and the second dimension;
   in response to an input selecting the option, formulating a query comprising an operation combining,
   a first subquery aggregating the first dimension into a combined dimension and including a field indicating the first dimension, and
   a second subquery aggregating the second dimension into the combined dimension and including the field indicating the second dimension;
   communicating the query to a data layer;
   receiving a query result comprising the measure, the combined dimension, and the field, wherein the query result comprises a first column comprising a plurality of measures and a second column comprising the combined dimension, wherein values of the second column comprise values from one of either the first dimension or the second dimension; and
   referencing the query result to display a chart comprising the measure and the combined dimension on a common axis with an affordance of the first dimension and the second dimension based upon the field.

2. A method as in claim 1 wherein the operation comprises a UNION operation.

3. A method as in claim 1 wherein the operation comprises a FULL OUTER JOIN operation.

4. A method as in claim 1 wherein:
   the dataset further comprises a third dimension;
   the operation further combines a third subquery aggregating the third dimension into the combined dimension and including the field indicating the third dimension; and
   generating the chart with the affordance of the third dimension based upon the field.

5. A method as in claim 1 comprising the first subquery aggregating the first dimension as a sum.

6. A method as in claim 1 comprising the first subquery aggregating the first dimension as an average.

7. A method as in claim 1 wherein the affordance comprises a color, a point symbol, or a line type.

8. A method as in claim 1 further comprising formatting the query as a JavaScript Object Notation (JSON) query object.

9. A method as in claim 8 wherein the query result is received as a JSON result object, the method further comprising parsing the JSON result object to display the chart.

10. A non-transitory computer readable storage medium embodying a computer program for performing a method, said method comprising:
    referencing a dataset comprising a measure, a first dimension, and a second dimension, in order to display an option to combine the first dimension and the second dimension;
    in response to an input selecting the option, formulating a query comprising an operation combining,
    a first subquery aggregating the first dimension into a combined dimension and including a field indicating the first dimension, and
    a second subquery aggregating the second dimension into the combined dimension and including the field indicating the second dimension;
    formatting the query as a JavaScript Object Notation (JSON) query object;
    communicating the JSON query object to a data layer;
    receiving a JSON result object comprising the measure, the combined dimension, and the field, wherein the JSON result object comprises a first column comprising a plurality of measures and a second column comprising the combined dimension, wherein values of the second column comprise values from one of either the first dimension or the second dimension; and
    parsing the JSON result object to display a chart comprising the measure and the combined dimension on a common axis with an affordance of the first dimension and the second dimension based upon the field.

11. A non-transitory computer readable storage medium as in claim 10 wherein the operation comprises a UNION operation.

12. A non-transitory computer readable storage medium as in claim 10 wherein the operation comprises a FULL OUTER JOIN operation.

13. A non-transitory computer readable storage medium as in claim 10 wherein the method comprises aggregating the first dimension as a sum.

14. A non-transitory computer readable storage medium as in claim 10 wherein the method comprises aggregating the first dimension as an average.

15. A non-transitory computer readable storage medium as in claim 10 wherein the affordance comprises a color, a point symbol, or a line type.

16. A computer system comprising:
   one or more processors;
   a software program, executable on said computer system, the software program configured to cause an in-memory database engine to:
   reference a dataset in an in-memory database and comprising a measure, a first dimension, and a second dimension, in order to display an option to combine the first dimension and the second dimension;
   in response to an input selecting the option, formulate a query comprising an operation combining,
   a first subquery aggregating the first dimension into a combined dimension and including a field indicating the first dimension, and
   a second subquery aggregating the second dimension into the combined dimension and including the field indicating the second dimension;
   communicate the query to the in-memory database;
   receive a query result comprising the measure, the combined dimension, and the field, wherein the query result comprises a first column comprising a plurality of measures and a second column comprising the combined dimension, wherein values of the second column comprise values from one of either the first dimension or the second dimension; and
   reference the query result to display a chart comprising the measure and the combined dimension on a common axis with an affordance of the first dimension and the second dimension based upon the field.

17. A computer system as in claim 16 wherein the operation comprises a UNION operation.

18. A computer system as in claim 16 wherein the operation comprises a FULL OUTER JOIN operation.

19. A computer system as in claim 16 wherein the software is further configured to cause the in-memory database engine to aggregate the first dimension as a sum.

20. A computer system as in claim 16 wherein the software is further configured to cause the in-memory database engine to aggregate the first dimension as an average.

* * * * *